(12) United States Patent
Ishikawa et al.

(10) Patent No.: US 8,439,175 B2
(45) Date of Patent: May 14, 2013

(54) FAILURE DETECTING APPARATUS FOR HYDRAULIC CIRCUIT OF GEARBOX

(75) Inventors: Tomoaki Ishikawa, Wako (JP); Koichiro Inukai, Wako (JP); Akira Yoshida, Wako (JP); Atsushi Abe, Wako (JP); Tamaki Sakurai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 405 days.

(21) Appl. No.: 12/975,374

(22) Filed: Dec. 22, 2010

(65) Prior Publication Data

US 2011/0203682 A1 Aug. 25, 2011

(30) Foreign Application Priority Data

Feb. 24, 2010 (JP) .................................. 2010-039230

(51) Int. Cl.
*F16H 61/12* (2010.01)
*F16H 61/14* (2006.01)

(52) U.S. Cl.
USPC .................. 192/3.29; 192/85.63; 477/906

(58) Field of Classification Search .................. 192/3.29
See application file for complete search history.

(56) References Cited

U.S. PATENT DOCUMENTS

| 5,721,682 | A | * | 2/1998 | Arai et al. ........................ 701/67 |
| 6,155,396 | A | * | 12/2000 | Tsubata et al. ............. 192/85.63 |
| 6,907,970 | B2 | * | 6/2005 | Sugimura ..................... 188/382 |

FOREIGN PATENT DOCUMENTS

JP  11-236965 A  8/1999

* cited by examiner

*Primary Examiner* — Richard M. Lorence
(74) *Attorney, Agent, or Firm* — Ditthavong Mori & Steiner, P.C.

(57) ABSTRACT

A failure detecting apparatus for a hydraulic circuit of a gearbox includes an operating-state detector. The operating-state detector is configured to detect an operating state of a subject to be controlled with a control-signal pressure output from a solenoid valve. A current setting device is configured to set an electrical current supplied to a solenoid so as to close an output oil passage when a modulator valve is normal and to open the output oil passage when an open failure occurs in the modulator valve, while the solenoid valve is conductive. A failure determining device is configured to detect a failure of the modulator valve when the operating state of the subject to be detected by the operating-state detector is abnormal after a value of the electrical current to be supplied to the solenoid is set at the current setting device.

5 Claims, 4 Drawing Sheets

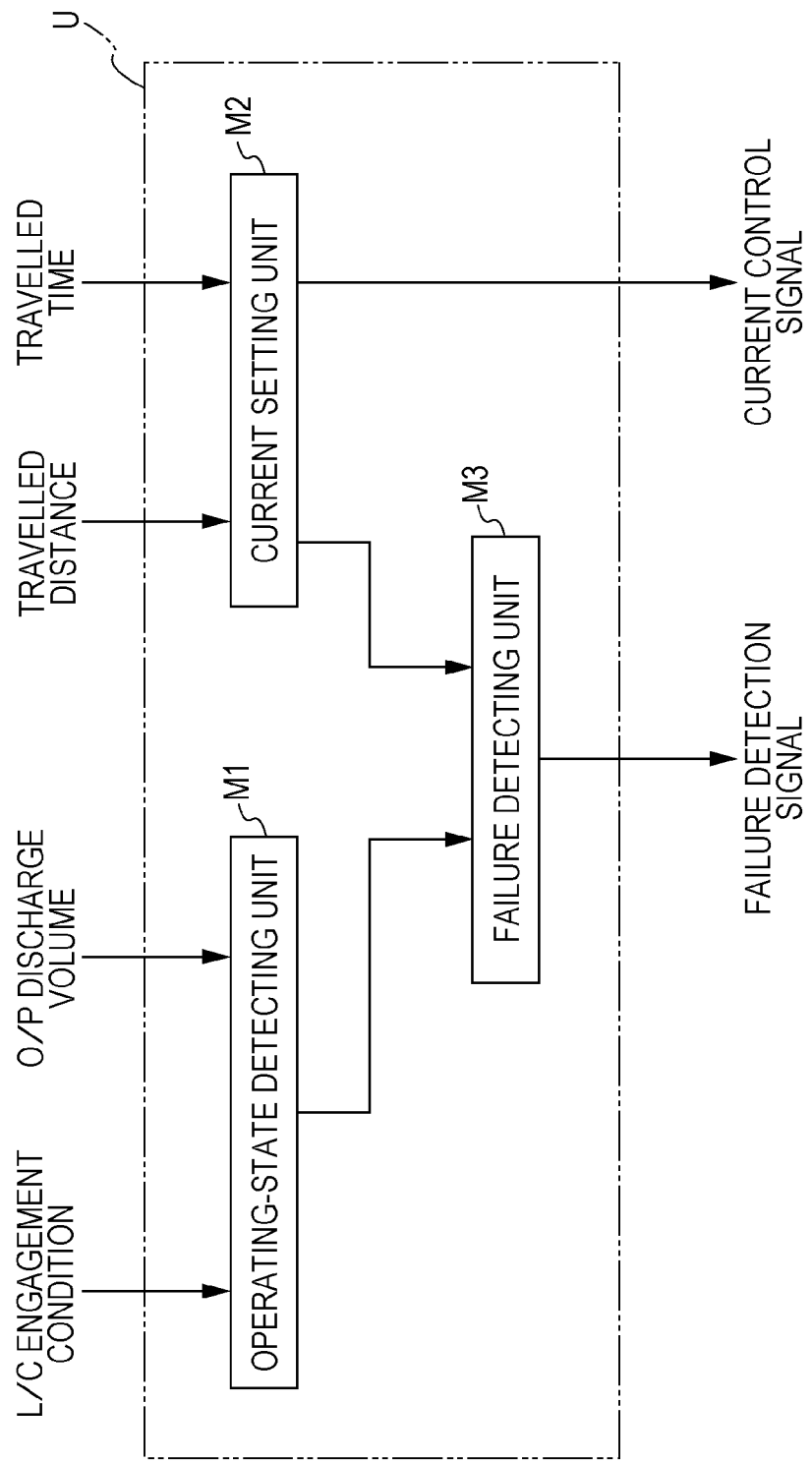

US 8,439,175 B2

FAILURE DETECTING APPARATUS FOR HYDRAULIC CIRCUIT OF GEARBOX

CROSS-REFERENCE TO RELATED APPLICATIONS

The present application claims priority under 35 U.S.C. §119 to Japanese Patent Application No. 2010-039230, filed Feb. 24, 2010, entitled "Failure detecting apparatus for Hydraulic Circuit of Gearbox". The contents of this application are incorporated herein by reference in their entirety.

BACKGROUND OF THE INVENTION

1. Field of the Invention

The present invention relates to a failure detecting apparatus for a hydraulic circuit of a gearbox.

2. Description of the Related Art

Japanese Unexamined Patent Application Publication No. 11-236965 discloses a belt-type continuously variable transmission that has an endless belt wound around a driving pulley provided on an input shaft and a driven pulley provided on an output shaft and controls with a linear solenoid valve the pulley hydraulic pressure of the hydraulic oil supplied to a hydraulic oil chamber of the driving pulley and a hydraulic oil chamber of the driven pulley in order to control the transmission gear ratio in a continuously variable manner by increasing or decreasing the effective diameter of pulleys.

The hydraulic circuit of the belt-type continuously variable gearbox includes a regulator valve that reduces the discharge pressure of an oil pump to line pressure, a clutch reducing (CR) valve that reduces the line pressure to CR (clutch reducing) pressure, which is the operating pressure of a hydraulic clutch and the pressure source of the linear solenoid valve, and a modulator valve that reduces the CR pressure to modulator pressure, which is the pressure source of an operating signal pressure of each shift valve.

When a closed failure occurs at the modulator valve, the closed failure can be detected since the operation of the subject to be controlled becomes abnormal because the operating signal pressure of which the pressure source is the modulator pressure disappears due to the modulator pressure being reduced to zero. On the other hand, when an open failure occurs at the modulator valve, the open failure cannot be detected since the subject to be controlled operates normally even though a high modulator pressure, which is higher than a normal value, is output.

When an open failure occurs in the modulator valve, as described by embodiments, when a control system failure occurs, lateral pressure applied to the driving pulley and the driven pulley is excessively reduced, causing the endless belt to slip and, as a result, lowering the durability of the belt-type continuously variable gearbox. For this reason, it is necessary to reliably detect an open failure of the modulator valve.

SUMMARY OF THE INVENTION

According to one aspect of the present invention, a hydraulic circuit of a gearbox includes an oil pump, a modulator valve, and a solenoid valve. The modulator valve reduces hydraulic pressure generated at the oil pump to modulator pressure. The solenoid valve generates control-signal pressure from the modulator pressure output from the modulator valve. The solenoid valve opens and closes an output oil passage with an electromagnetic force generated by a solenoid. A failure detecting apparatus for the hydraulic circuit includes an operating-state detector, a current setting device, and a failure determining device. The operating-state detector is configured to detect an operating state of a subject to be controlled with the control-signal pressure output from the solenoid valve. The current setting device is configured to set an electrical current supplied to the solenoid so as to close the output oil passage when the modulator valve is normal and to open the output oil passage when an open failure occurs in the modulator valve, while the solenoid valve is conductive. The failure determining device is configured to detect a failure of the modulator valve when the operating state of the subject to be detected by the operating-state detector is abnormal after a value of the electrical current to be supplied to the solenoid is set at the current setting device.

According to further aspect of the present invention, a hydraulic circuit system of a gearbox includes an oil pump, a modulator valve, a solenoid valve, and a failure detecting apparatus. The modulator valve reduces hydraulic pressure generated at the oil pump to modulator pressure. The solenoid valve generates control-signal pressure from the modulator pressure output from the modulator valve. The solenoid valve opens and closes an output oil passage with an electromagnetic force generated by a solenoid. The failure detecting apparatus includes an operating-state detector, a current setting device, and a failure determining device. The operating-state detector is configured to detect an operating state of a subject to be controlled with the control-signal pressure output from the solenoid valve. The current setting device is configured to set an electrical current supplied to the solenoid so as to close the output oil passage when the modulator valve is normal and to open the output oil passage when an open failure occurs in the modulator valve, while the solenoid valve is conductive. The failure determining device is configured to detect a failure of the modulator valve when the operating state of the subject to be detected by the operating-state detector is abnormal after a value of the electrical current to be supplied to the solenoid is set at the current setting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram of a failure detecting apparatus of a modulator valve.

DESCRIPTION OF THE EMBODIMENTS

Figure 1:
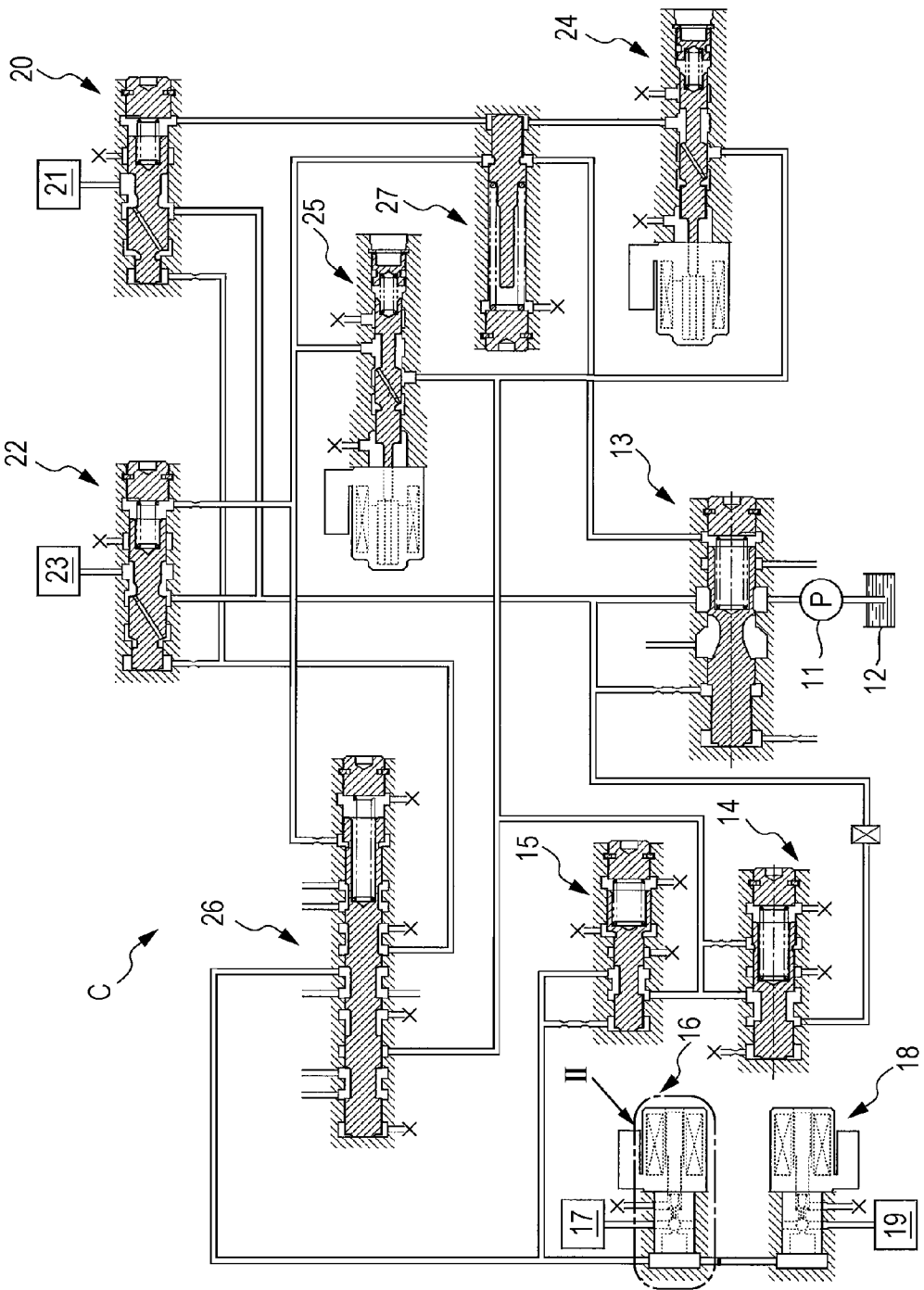
FIG. 1 illustrates part of a hydraulic circuit of a belt-type continuously variable gearbox.

The embodiments of the present invention will be described below with FIGS. 1 to 4, wherein like reference numerals designate corresponding or identical elements throughout the various drawings.

FIG. 1 illustrates part of a hydraulic circuit C of a belt-type continuously variable gearbox. In the hydraulic circuit C, the pressure of oil pumped up from an oil tank 12 by an oil pump 11 is regulated to line pressure at a regulator valve 13; the line pressure is reduced to CR pressure at a clutch reducing (CR) valve 14; and the CR pressure is reduced to modulator pressure at a modulator valve 15. The modulator pressure is converted to ON/OFF control-signal pressure at a constantly open first shift solenoid valve 16 and is supplied to a lock-up clutch control circuit 17 of a torque converter and is also converted to ON/OFF control-signal pressure at a constantly open second shift solenoid valve 18 and is supplied to a variable volume circuit 19 of the oil pump 11.

When the first shift solenoid valve 16 is degaussed and outputs a control-signal pressure, the lock-up clutch is disengaged, whereas, when the first shift solenoid valve 16 is excited and does not output a control-signal pressure, the lock-up clutch is engaged. When the second shift solenoid valve 18 is degaussed and a control-signal pressure is output, the discharge volume of the oil pump 11 is set to full volume, whereas when the second shift solenoid valve 18 is excited and a control-signal pressure is not output, the discharge volume of the oil pump 11 is set to half volume.

The line pressure output from the regulator valve 13 is supplied to a DR hydraulic oil chamber 21 that changes the effective radius of a driving pulley via a DR regulator valve 20 and is also supplied to a DN hydraulic oil chamber 23 that changes the effective radius of a driven pulley via a DN regulator valve 22. The CR pressure output from the CR valve 14 is supplied to the DR regulator valve 20 at the right side in the drawing via a DR control valve 24 so as to regulate the pulley hydraulic pressure output to the DR hydraulic oil chamber 21 by the DR control valve 24. The CR pressure output from the CR valve 14 is supplied to the DN regulator valve 22 at the right side in the drawing via a DN control valve 25, which includes a linear solenoid valve, so as to regulate the pulley hydraulic pressure output to the DN hydraulic oil chamber 23 by the DN control valve 25.

A shift inhibitor valve 26 receiving the modulator pressure from the CR valve 14 supplies the modulator pressure to the DR regulator valve 20 and the DN regulator valve 22 at the left ends in the drawing. The control hydraulic pressure supplied by the DN control valve 25 to the DN regulator valve 22 is supplied to the shift inhibitor valve 26 at the right side in the drawing.

FIG. 1 also illustrates an accumulator valve 27.

As illustrated in FIG. 2, the first and second shift solenoid valves 16 and 18, each including a constantly open three-way valve, have the same structure and each include a plunger 32 forwardly driven by a solenoid 31, a return spring 33 urging the plunger 32 in the backward direction, a ball 34, an inlet port 35 to which the modulator pressure is input, an outlet port 36 to which the control-signal pressure is output, and a drain port 37 capable of communicating with the outlet port 36.

By degaussing the solenoid 31, the plunger 32 retracts toward the right in the drawing due to the modulator pressure from the inlet port 35 acting on the ball 34 and a resilient force of the return spring 33, causing the ball 34 to be seated in a seat 38. As a result, the inlet port 35 communicates with the outlet port 36, and the outlet port 36 blocked off from the drain port 37 (see FIG. 2A). By exciting the solenoid 31, the plunger 32 moves forward toward the left in the drawing and compresses the return spring 33, causing the ball 34 to be seated in a seat 39. As a result, the inlet port 35 is blocked off from the outlet port 36, and the outlet port 36 communicates with the drain port 37 (see FIG. 2B).

As illustrated in FIG. 3, an electronic control unit U that detects a failure in the modulator valve 15 includes an operating-state detecting unit M1, a current setting unit M2, and a failure determining unit M3.

The operating-state detecting unit M1 detects the operating state of the lock-up clutch control circuit 17 (see FIG. 1) of the torque converter, which is to be controlled by control-signal pressure output from the first shift solenoid valve 16, and detects the operating state of the variable volume circuit 19 (see FIG. 1) of the oil pump 11, which is the subject to be controlled by control-signal pressure output from the second shift solenoid valve 18.

Specifically, when the lock-up clutch control circuit 17 is in a state of releasing the engagement of the lock-up clutch while an instruction for engaging the lock-up clutch is being output or when the lock-up clutch control circuit 17 is in a state of engaging the lock-up clutch while an instruction of releasing the engagement of the lock-up clutch is being output, the operating-state detecting unit M1 detects abnormal operation of the lock-up clutch control circuit 17. Furthermore, when the variable volume circuit 19 is set to half volume while an instruction for setting the discharge volume of the oil pump 11 to full volume is output or when the variable volume circuit 19 is set to full volume while an instruction for setting the discharge volume of the oil pump 11 to half volume is output, the operating-state detecting unit M1 detects abnormal operation of the variable volume circuit 19.

The current setting unit M2, when detecting a failure in the first and second first shift solenoid valves 16 and 18, reduces the level of the electrical current supplied to the solenoid 31 to a level lower than normal (i.e., when failure detection is not performed). Failure detection is performed, for example, each time the distance traveled by a vehicle reaches a predetermined value, each time the traveling time of a vehicle reaches a predetermined value, or each time the operating condition of a vehicle satisfies a condition suitable for failure detection.

The failure determining unit M3 detects a failure of the modulator valve 15 on the basis of the operating state of the lock-up clutch control circuit 17 or variable volume circuit 19 that is detected by the operating-state detecting unit M1 when the level of the electrical current supplied by the current setting unit M2 to the solenoids 31 of the first and second shift solenoid valves 16 and 18 is decreased.

Next, normal operation of the hydraulic circuit C will be described.

The pressure of the oil pumped up from the oil tank 12 by the oil pump 11 is regulated to line pressure at the regulator valve 13. The line pressure is reduced to CR pressure at the CR valve 14. Then, the CR pressure is reduced to modulator pressure at the modulator valve 15.

Line pressure PL is supplied to the DR hydraulic oil chamber 21 of the belt-type continuously variable gearbox via the DR regulator valve 20 and the DN hydraulic oil chamber 23 of the belt-type continuously variable gearbox via the DN regulator valve 22. While the Line pressure PL is being supplied, control hydraulic pressure obtained by regulating the CR pressure at the DR control valve 24, which includes a linear solenoid valve, is supplied to the DR regulator valve 20 to control the pulley hydraulic pressure to be supplied to the DR hydraulic oil chamber 21. Similarly, control hydraulic pressure obtained by regulating the CR pressure at the DN control valve 25, which includes a linear solenoid valve, is supplied to the DN regulator valve 22 to control the pulley hydraulic pressure to be supplied to the DN hydraulic oil chamber 23. In this way, the grove widths of the driving pulley and the driven pulley are controlled to increase and decrease in opposite manners so as to continuously variably change the transmission gear ratio of the belt-type continuously variable gearbox.

Figure 2A:
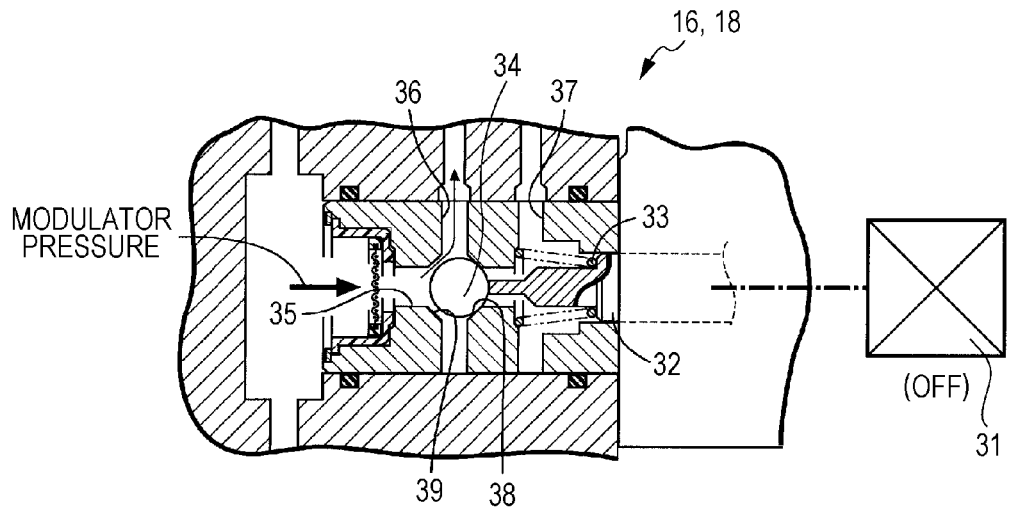
FIGS. 2A and 2B are enlarged diagrams SECTION II of FIG. 1.
Figure 2B:
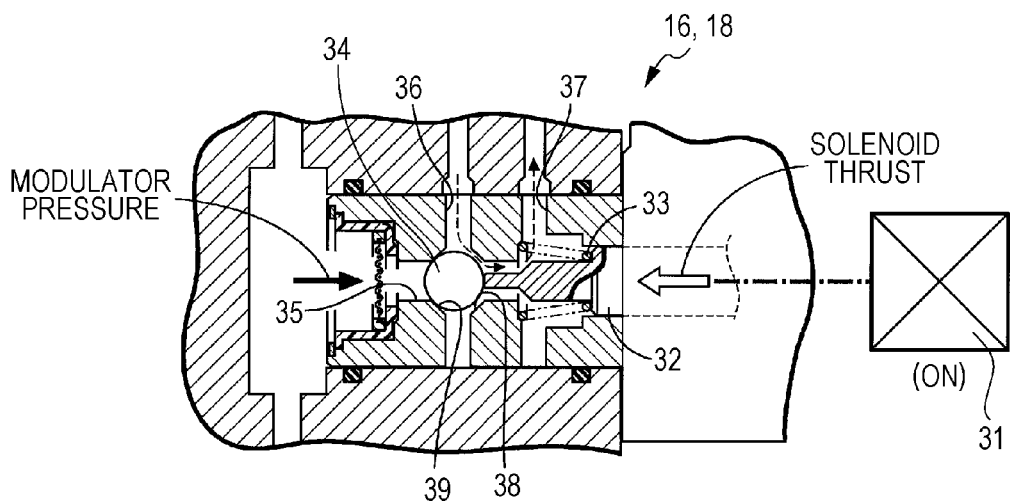

As illustrated in FIG. 2A, by degaussing the first shift solenoid valve 16, the plunger 32 retracts, causing the ball 34 to be seated in the seat 38 and the inlet port 35 and the outlet port 36 to communicate with each other so that the modulator pressure is supplied to the lock-up clutch control circuit 17. As a result, the engagement of the lock-up clutch is released. As illustrated in FIG. 2B, by exciting the first shift solenoid valve 16, the plunger 32 moves forward, causing the ball 34 to be seated in the seat 39 and the outlet port 36 and drain port 37 to communicate with each other so that the modulator pressure is released from the lock-up clutch control circuit 17. As a result, the lock-up clutch engages.

Similarly, by degaussing the second shift solenoid valve 18, the plunger 32 retracts, causing the ball 34 to be seated in the seat 38 and the inlet port 35 and outlet port 36 to communicate with each other so that the modulator pressure is supplied to the variable volume circuit 19. As a result, the discharge volume of the oil pump 11 is set to full volume. By exciting the second shift solenoid valve 18, the plunger 32 moves forward, causing the ball 34 to be seated in the seat 39 and the outlet port 36 and drain port 37 to communicate with each other so that the modulator pressure is released from the variable volume circuit 19. As a result, the discharge volume of the oil pump 11 is set to half volume.

Next, the operation performed when the modulator valve 15 fails will be described.

There are two types of failure of the modulator valve 15: a closed failure and an open failure. When a closed failure occurs, the modulator pressure output by the modulator valve 15 is decreases to zero, whereas, when an open failure occurs, the pressure reducing effect of the modulator valve 15 is lost, and the CR pressure, which is the pressure source, is output instead of the modulator pressure.

When the modulator pressure is reduced to zero due to a closed failure of the modulator valve 15, control-signal pressure is not output to the lock-up clutch control circuit 17 and the variable volume circuit 19. As a result, the lock-up clutch cannot be engaged or released and the discharge volume of the oil pump 11 cannot be switched between full volume and half volume. Therefore, by detecting such abnormality by the operating-state detecting unit M1, the failure determining unit M3 can detect a closed failure of the modulator valve 15.

On the other hand, even when the modulator pressure is increased to the CR pressure due to an open failure of the modulator valve 15, merely control-signal pressure higher than normal will be supplied to the lock-up clutch control circuit 17 and the variable volume circuit 19. Since the lock-up clutch can be engaged and released and the discharge volume of the oil pump 11 can be switched between full volume and half volume without any problems, an open failure of the modulator valve 15 cannot be detected using the above-described procedure for normal operation. However, it is necessary to detect an open failure because problems, such as those described below, occur in the control of the pulley hydraulic pressure of the belt-type continuously variable gearbox due to an open failure of the modulator valve 15.

When the system fails due to an abnormality in the vehicle, the DR control valve 24 and the DN control valve 25 are fully opened, and the line pressure, which is not reduced at the DR regulator valve 20 and the DN regulator valve 22, is supplied to the DR hydraulic oil chamber 21 and the DN hydraulic oil chamber 23 of the belt-type continuously variable gearbox. In this way, the transmission gear ratio is changed to a value on the overdrive (OD) side so that the engine does not enter an over-rotation state. At this time, when the pulley hydraulic pressure supplied to the DR hydraulic oil chamber 21 and the DN hydraulic oil chamber 23 becomes too large, there is an adverse effect on the durability of the endless belt due to excess lateral pressure applied to the pulley. Therefore, the pulley hydraulic pressure is reduced by supplying the modulator pressure to the DR regulator valve 20 and the DN regulator valve 22.

That is, when the DN control valve 25 is fully opened due to system failure, the maximum hydraulic pressure output by the DN control valve 25 is supplied to a shoulder part of a spur of the shift inhibitor valve 26 at the right side in the drawing. As the spur moves to the right in the drawing, the modulator pressure is supplied to the left ends of the DR regulator valve 20 and DN regulator valve 22 via the shift inhibitor valve 26. In this way, the line pressure is reduced and then supplied to the DR hydraulic oil chamber 21 and the DN hydraulic oil chamber 23. As a result, the adverse effect on the durability of the endless belt due to excess lateral pressure applied to the pulley is prevented.

However, when an open failure occurs in the modulator valve 15, the CR pressure, which is higher than the normal modulator pressure, is supplied to the DR regulator valve 20 and the DN regulator valve 22 at the left ends in the drawing of via the shift inhibitor valve 26, causing a reduction more than wanted in the pulley hydraulic pressure supplied to the DR hydraulic oil chamber 21 and the DN hydraulic oil chamber 23. As a result, slippage occurs in the endless belt, causing a reduction in the durability of the endless belt. Due to such problems, it is desirable to detect an open failure in the modulator valve 15.

Figure 4A:
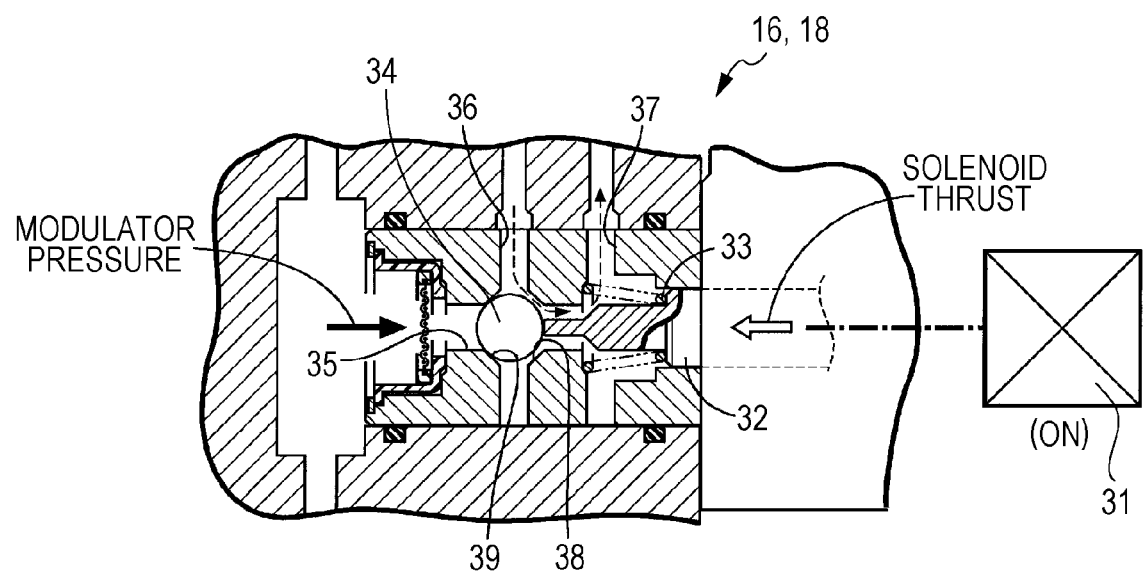
FIGS. 4A and 4B illustrate the operation of failure detection.
Figure 4B:
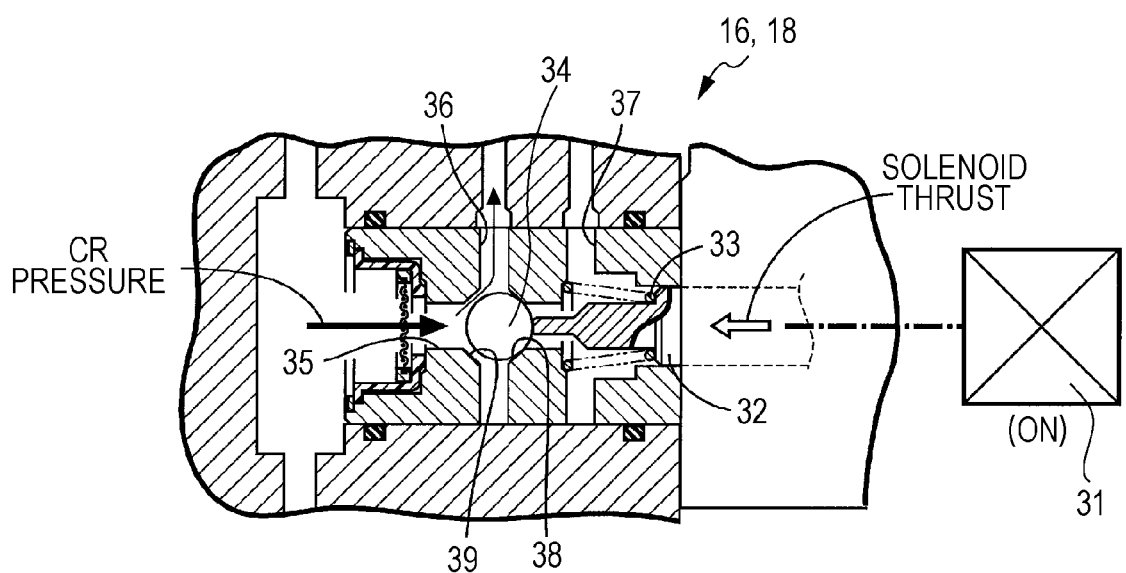

Therefore, the current setting unit M2 of the electronic control unit U is set to a power saving mode in which the level of electrical current supplied to the solenoids 31 of the first and second shift solenoid valves 16 and 18 is reduced more than that of the normal current at the above-described predetermined timings. As illustrated in FIG. 4A, in a power saving mode in which the level of electrical current supplied to the solenoids 31 is reduced more than that of the normal current, when the normal modulator pressure is input to the inlet port 35, the forward thrust of the plunger 32 is strong enough to seat the ball 34 in the seat 39. However, when CR pressure that is higher than normal modulator pressure is input to the inlet port 35 due to an open failure of the modulator valve 15, the ball 34 cannot be seated in the seat 39 because of a shortage in the forward thrust of the plunger 32, the control-signal pressure that should not be output from the outlet port 36 is, instead, output.

As a result, since the operating-state detecting unit M1 detects an abnormality in the operating state of the lock-up clutch control circuit 17 or the variable volume circuit 19, the failure determining unit M3 can detect an open failure of the modulator valve 15.

As described above, when the shift solenoid valves 16 and 18 are made conductive, the electrical current supplied to the solenoids 31 is set such that the ball 34 is seated in the seat 39 when normal modulator pressure is output from the modulator valve 15 and such that the ball 34 moves away from the seat 39 when the CR pressure higher than the modulator pressure is output due to an open failure of the modulator valve 15. Therefore, when the CR pressure higher than the modulator pressure is output due to an open failure of the modulator valve 15, the control-signal pressure is constantly output to the first and second shift solenoid valves 16 and 18. Accordingly, when the operating state of the subject to be controlled detected by the operating-state detecting unit M1 is in an abnormal state, the failure determining unit M3 can detect an open failure of the modulator valve 15.

If the operating state of the subject to be controlled recovers from such an abnormal state to a normal state when the electrical current supplied to the first and second shift solenoid valves 16 and 18 is returned to a normal value, an open failure of the modulator valve 15 can be confirmed even more reliably.

The embodiments of the present invention have been described above. However, various modifications to the design may be made without departing from the scope of the intention.

For example, the gearbox to which the hydraulic circuit C according to the embodiment of the present invention is applied is not limited to the belt-type continuously variable gearbox according to the above-described embodiments.

Instead of reducing the level of the electrical current supplied to the first shift solenoid valves 16 and 18 each time the distance traveled by a vehicle reaches a predetermined value, each time the traveling time reaches a predetermined value, or each time the operating condition of the vehicle satisfies a condition suitable for failure detection, the level of the electrical current may be constantly reduced.

According to the embodiment of the present invention, the modulator valve reduces hydraulic pressure generated at the oil pump to modulator pressure and outputs the modulator pressure, and the solenoid valve outputs the modulator pressure as control-signal pressure to a subject to be controlled by opening or closing the output oil passage with an electromagnetic force generated by the solenoid. A current setting unit set an electrical current supplied to the solenoid valve such that, when the solenoid valve is excited, the output oil passage is closed if the modulator valve output normal modulator pressure and opened if hydraulic pressure higher than the modulator pressure is output due to an open failure of the modulator valve. Therefore, when CR pressure is output due to an open failure of the modulator valve, the solenoid valve causes the output oil passage to stay open. Accordingly, when the operating state of a subject to be controlled detected by the operating-state detecting unit is abnormal, the failure detecting unit can detect an open failure of the modulator valve.

According to the embodiment of the present invention, an open failure of the solenoid valve can be detected reliably by the operating-state detecting unit detecting the engagement state of a lock-up clutch controlled by the control-signal pressure output by the solenoid valve.

According to the embodiment of the present invention, an open failure of the solenoid valve can be detected reliably by the operating-state detecting unit detecting the discharge volume of the oil pump controlled by the control-signal pressure output by the solenoid valve.

Obviously, numerous modifications and variations of the present invention are possible in light of the above teachings. It is therefore to be understood that within the scope of the appended claims, the invention may be practiced otherwise than as specifically described herein.

What is claimed is:

1. A failure detecting apparatus for a hydraulic circuit of a gearbox, the hydraulic circuit including an oil pump, a modulator valve to reduce hydraulic pressure generated at the oil pump to modulator pressure, and a solenoid valve to generate control-signal pressure from the modulator pressure output from the modulator valve wherein the solenoid valve opens and closes an output oil passage with an electromagnetic force generated by a solenoid, the failure detecting apparatus comprising:
an operating-state detector configured to detect an operating state of a subject to be controlled with the control-signal pressure output from the solenoid valve;
a current setting device configured to set an electrical current supplied to the solenoid so as to close the output oil passage when the modulator valve is normal and to open the output oil passage when an open failure occurs in the modulator valve, while the solenoid valve is conductive; and
a failure determining device configured to detect a failure of the modulator valve when the operating state of the subject to be detected by the operating-state detector is abnormal after a value of the electrical current to be supplied to the solenoid is set at the current setting device.

2. The failure detecting apparatus for a hydraulic circuit of a gearbox according to claim 1, wherein the subject to be controlled includes an engagement state of lock-up clutches of torque converters provided on an engine and a transmission.

3. The failure detecting apparatus for a hydraulic circuit of a gearbox according to claim 1, wherein the subject to be controlled comprises a discharge volume of the oil pump.

4. A failure detecting apparatus for a hydraulic circuit of a gearbox, the hydraulic circuit including an oil pump, a modulator valve to reduce hydraulic pressure generated at the oil pump to modulator pressure, and a solenoid valve to generate control-signal pressure from the modulator pressure output from the modulator valve wherein the solenoid valve opens and closes an output oil passage with an electromagnetic force generated by a solenoid, the failure detecting apparatus comprising:
operating-state detection means for detecting an operating state of a subject to be controlled with the control-signal pressure output from the solenoid valve;
current setting means for setting an electrical current supplied to the solenoid so as to close the output oil passage when the modulator valve is normal and to open the output oil passage when an open failure occurs in the modulator valve, while the solenoid valve is conductive; and
failure determining means for detecting a failure of the modulator valve when the operating state of the subject to be detected by the operating-state detector is abnormal after a value of the electrical current to be supplied to the solenoid is set at the current setting device.

5. A hydraulic circuit system of a gearbox, comprising:
an oil pump;
a modulator valve to reduce hydraulic pressure generated at the oil pump to modulator pressure;
a solenoid valve to generate control-signal pressure from the modulator pressure output from the modulator valve, the solenoid valve opening and closing an output oil passage with an electromagnetic force generated by a solenoid
a failure detecting apparatus comprising:
an operating-state detector configured to detect an operating state of a subject to be controlled with the control-signal pressure output from the solenoid valve;
a current setting device configured to set an electrical current supplied to the solenoid so as to close the output oil passage when the modulator valve is normal and to open the output oil passage when an open failure occurs in the modulator valve, while the solenoid valve is conductive; and
a failure determining device configured to detect a failure of the modulator valve when the operating state of the subject to be detected by the operating-state detector is abnormal after a value of the electrical current to be supplied to the solenoid is set at the current setting device.

* * * * *